(12) United States Patent
Ramaswamy

(10) Patent No.: US 8,135,848 B2
(45) Date of Patent: Mar. 13, 2012

(54) ALTERNATE TO EMAIL FOR MESSAGES OF GENERAL INTEREST

(75) Inventor: Venkat Ramaswamy, Falls Church, VA (US)

(73) Assignee: Venkat Ramaswamy, Falls Church, VA (US)

(*) Notice: Subject to any disclaimer, the term of this patent is extended or adjusted under 35 U.S.C. 154(b) by 953 days.

(21) Appl. No.: 11/743,090

(22) Filed: May 1, 2007

(65) Prior Publication Data

US 2008/0276097 A1    Nov. 6, 2008

(51) Int. Cl.
*G06F 15/16* (2006.01)
(52) U.S. Cl. ........ 709/228; 709/203; 709/223; 709/224; 709/225; 715/752; 370/432
(58) Field of Classification Search .................. 709/203, 709/223, 224, 225, 228; 713/713, 714; 715/741, 715/743, 752, 758; 370/432
See application file for complete search history.

(56) References Cited

U.S. PATENT DOCUMENTS

| | | | | |
|---|---|---|---|---|
| 5,905,957 A * | 5/1999 | Olds | .......................... | 455/435.1 |
| 6,525,747 B1 * | 2/2003 | Bezos | .......................... | 715/751 |
| 7,606,865 B2 * | 10/2009 | Kumar et al. | ................. | 709/206 |
| 7,769,144 B2 * | 8/2010 | Yao et al. | .................... | 379/88.13 |
| 2005/0015626 A1 * | 1/2005 | Chasin | .......................... | 713/201 |
| 2005/0278183 A1 * | 12/2005 | Ammons | .......................... | 705/1 |
| 2006/0109810 A1 * | 5/2006 | Au et al. | ....................... | 370/328 |
| 2007/0005717 A1 * | 1/2007 | LeVasseur et al. | ............ | 709/206 |
| 2008/0183832 A1 * | 7/2008 | Kirkland et al. | .............. | 709/206 |

\* cited by examiner

*Primary Examiner* — Thuong T Nguyen
(74) *Attorney, Agent, or Firm* — John Curtin

(57) ABSTRACT

This invention is an online system to forward and discuss messages of common interest among members of the system. The system is based on a central server that manages all member accounts, messages and message flow among the members. The system introduces the concept of private comments on a public message. While the message is open to all members of the system, each comment on the message is restricted to be viewed only by members to whom the comment is sent to. This allows an email like interface to forward and discuss the same message among different groups of people. The system also provides metrics related to the overall reach and popularity of the message.

37 Claims, 9 Drawing Sheets

If you are already a member, please login here:

Username: [_____]  Password: [_____]  [Login]

If you are not a member, please register here:

Select an unique username: [_____]

Select a Password: [_____]

Reenter password: [_____]

[Register]

FIG. 2

Welcome, Ram Venkat| Messages | Compose | Contacts | Preferences | Help | Logout

| From | Subject | Sent at |
|---|---|---|
| Dave Mitchell | Woman, 95, to be oldest college graduate | Fri Apr 27 2007 03:31:43 GMT-0400 (Eastern Daylight Time) |
| Rob Kennedy | Saudi tribe holds camel beauty pageant | Fri Apr 27 2007 03:31:41 GMT-0400 (Eastern Daylight Time) |
| Tom Wight | Real-life spider-men? | Fri Apr 27 2007 03:31:37 GMT-0400 (Eastern Daylight Time) |
| Jack Siebel | Women's town to put men in their place | Fri Apr 27 2007 03:31:34 GMT-0400 (Eastern Daylight Time) |
| John Sawyer | Plight of caged animals | Fri Apr 27 2007 03:31:32 GMT-0400 (Eastern Daylight Time) |
| | | |
| | | |
| | | |
| | | |

FIG. 3

Welcome, Ram Venkat|Messages|Compose|Contacts|Preferences|Help|Logout

[ Forward/Reply ]

Message

Subject: Plight of Caged animals

It is wrong to put animals in cages. Please do not support any business or organization that commits this cruel act. Please write to your legislators to stop any public zoo from doing this. Also, please boycott any circus that treats animals this way. This link Bad public zoos shows a web page that gives a list of all public zoos that cage animals.

Comments

From: John Sawyer
Sent To: Ram Venkat, Tom Wight, Dave Mitchell
Sent At: Thu Apr 26 2007 20:20:33

This is a cruel practice. I forwarded this message as I totally agree with it. Please forward this message to your friends and spread the word around.

From: Ram Venkat
Sent To: Tom Wight, John Sawyer, Dave Mitchell
Sent At: Thu Apr 26 2007 20:50:12

I think these animals are safer in cages. Moreover, they have a much better life in zoos than in the wild. But, I did forward this message to some of my other friends.

From: John Sawyer
Sent To: Ram Venkat
Sent At: Thu Apr 26 2007 21:10:42

I think that is like saying life in a Jail is better than outside because you are constantly under security!? Thanks anyway, for forwarding the message to your friends. I hope to see an increase in number of viewers of this message soon.

From: Tom Wight
Sent To: John Sawyer, Ram Venkat, Dave Mitchell
Sent At: Thu Apr 26 2007 20:50:12

Good cause, John.

From: John Sawyer
Sent To: Tom Wight, Ram Venkat, Dave Mitchell
Sent At: Thu Apr 26 2007 20:50:12

Thanks, Tom.

FIG. 4

Welcome, Ram Venkat | Messages|Compose|Contacts|Preferences|Help|Logout

Forward

To:
Subject:

Comment:

Message

Subject: Plight of caged animals

It is wrong to put animals in cages. Please do not support any business or organization that commits this cruel act. Please write to your legislators to stop any public zoo from doing this. Also, please boycott any circus that treats animals this way. This link Bad public zoos shows a web page that gives a list of all public zoos that cage animals.

FIG. 7

Welcome, Ram Venkat| Messages|Compose|Contacts|Preferences|Help|Logout

| Name | Last Received | Last Sent |
|---|---|---|
| John Sawyer | Fri Apr 27 2007 03:31:32 GMT-0400 (Eastern Daylight Time) | Fri Apr 27 2007 03:31:36 GMT-0400 (Eastern Daylight Time) |
| Jack Siebel | Fri Apr 27 2007 03:31:34 GMT-0400 (Eastern Daylight Time) | Fri Apr 27 2007 03:31:37 GMT-0400 (Eastern Daylight Time) |
| Tom Wight | Fri Apr 27 2007 03:31:37 GMT-0400 (Eastern Daylight Time) | Fri Apr 27 2007 03:31:36 GMT-0400 (Eastern Daylight Time) |
| Rob Kennedy | Fri Apr 27 2007 03:31:41 GMT-0400 (Eastern Daylight Time) | Fri Apr 27 2007 03:31:36 GMT-0400 (Eastern Daylight Time) |
| Dave Mitchell | Fri Apr 27 2007 03:31:43 GMT-0400 (Eastern Daylight Time) | Fri Apr 27 2007 03:31:37 GMT-0400 (Eastern Daylight Time) |

FIG. 8

ALTERNATE TO EMAIL FOR MESSAGES OF GENERAL INTEREST

FIELD OF INVENTION

This invention pertains to an online computer system, people becoming members in the system, messages in the system with unique identities, central storage and processing of message flow, message discussion among different groups of members and overall metrics of the message.

BACKGROUND DESCRIPTION

Emails and Blogs are widely used to share an interesting article or a public social message and discuss it with other people.

While email is a powerful tool for personal communication, it has several limitations when used to forward a message of general interest.

a) When friends forward an email to their friends, it usually includes the original author's comments and his email address. This continues as the email gets forwarded recursively. After repeated forwarding, one can see all the people that forwarded the email and also see the various comments that friends of friends made. Hence this method of sharing the public message compromises the privacy of the participants.

b) There is no fail-safe way to track the progress of the message. As the email gets forwarded, different email servers process each email and there is no universal identifier for a message.

c) Since email is primarily used for personal communication, a public message can be considered an intrusion on one's privacy.

d) Threading emails on the same topic gets complicated when everyone in the discussion group do not use the same email server. Some email servers do not populate the 'Reply-To' or 'References' headers of an email correctly. Also, if the same message is sent to two groups of people, say friends and family, as two different messages, they cannot be threaded together by the email program.

e) Chain forwarding of email makes inefficient use of computing resources.

f) There is no easy way to discourage an email recipient to not forward an email.

On the other hand, Blogs and Message groups do not have any privacy. They expose the message and all the user comments to everyone. A private blog restricts the message itself to a few people but not the comments on the message.

This invention is an alternate system for forwarding and discussing messages of general interest. The system exposes the message to all the members while each member can discuss the message with just his friends.

SUMMARY OF INVENTION

This invention describes a system that has the following characteristics:

a) People register with the system and become members to send and receive messages. All messages are read, sent and received through the same central system.

b) Each new message is uniquely identified with a single copy on the server. This allows the system to track each message as the message is discussed or forwarded by members.

c) A message is differentiated from comments on the message. When a member creates a new message, he specifies the message and his comments (on the message) separately.

d) Forwarding does not create a new message. When forwarding, a member creates a new comment on the same original message. Replying is just a particular case of forwarding where the recipient is the same as the sender of the message.

e) Comments received from another member cannot be forwarded. This implies that a member can only view comments of other members that were sent to him by those members.

f) A member can see all his comments and other members' comments that were sent to him, together with the message, as one thread. This is regardless of how many different times he forwarded the message or how many different people he sent the message to.

g) System maintains cumulative metrics on the message including how many people viewed the message, forwarded it, how many comments were made, which links in the message were clicked, what form values in the message were submitted and others.

h) System shows advertisements related to the message using an Ad Server.

BRIEF DESCRIPTION OF THE DRAWINGS

The drawings describe the preferred embodiment of the invention in which the system is implemented as an online website:

FIG. 2 shows the opening web page in which a person can register with the system or existing members can log in to the system.

FIG. 3 shows a web page in which an user sees the list of latest messages that were forwarded to him and forwarded by him.

FIG. 4 shows a web page in which an user sees a message and all the comments on that message by himself and other members in reverse chronological order.

FIG. 7 shows a web page which allows an user to forward a message that he received from some other member.

FIG. 8 shows a web page that displays the user's contacts list.

DETAILED DESCRIPTION OF THE PREFERRED EMBODIMENTS

Figure 1:
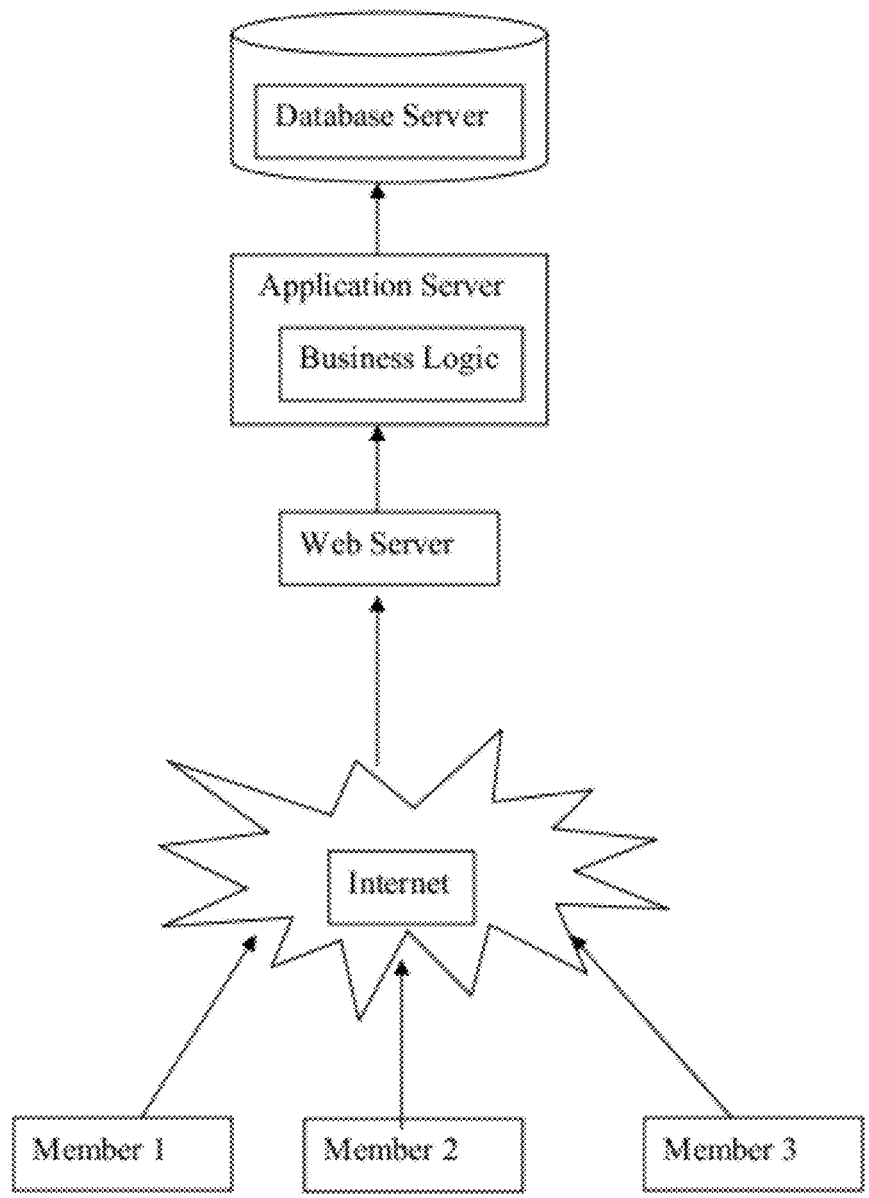
FIG. 1 shows the software architecture of the system

FIG. 1 describes the basic software architecture of the preferred embodiment. A database server like MySQL will store all the data while the application server will perform the business logic. A web server will allow members to connect to the system over the internet using a client software like a web browser. All these elements are part of a standard three-tier software architecture, which is common in modern web applications.

FIG. 2 represents the opening page or "Home page" of the preferred embodiment, which will be a website with a standard HTTP address. From this homepage, one can submit a web form to become a member or if he is already a member, can login to the system using his username and password. Henceforth, the current logged in member is referred as the "user".

FIG. 3 represents the first web page that the user will see after he logs in to the system. It lists the messages that have been forwarded by other members to the user and messages that have been forwarded by the user to other members. It is arranged in reverse chronological order of the time that the message was forwarded.

FIG. 4 represents a message that has been forwarded by another member to the user or a message that the user forwarded to other members. It also includes all the comments on that message that were forwarded by other members to the user and all the comments on that message that the user forwarded to other members. All the comments are arranged in reverse chronological order. The system shows who sent each comment and to whom it was sent to.

Figure 5:
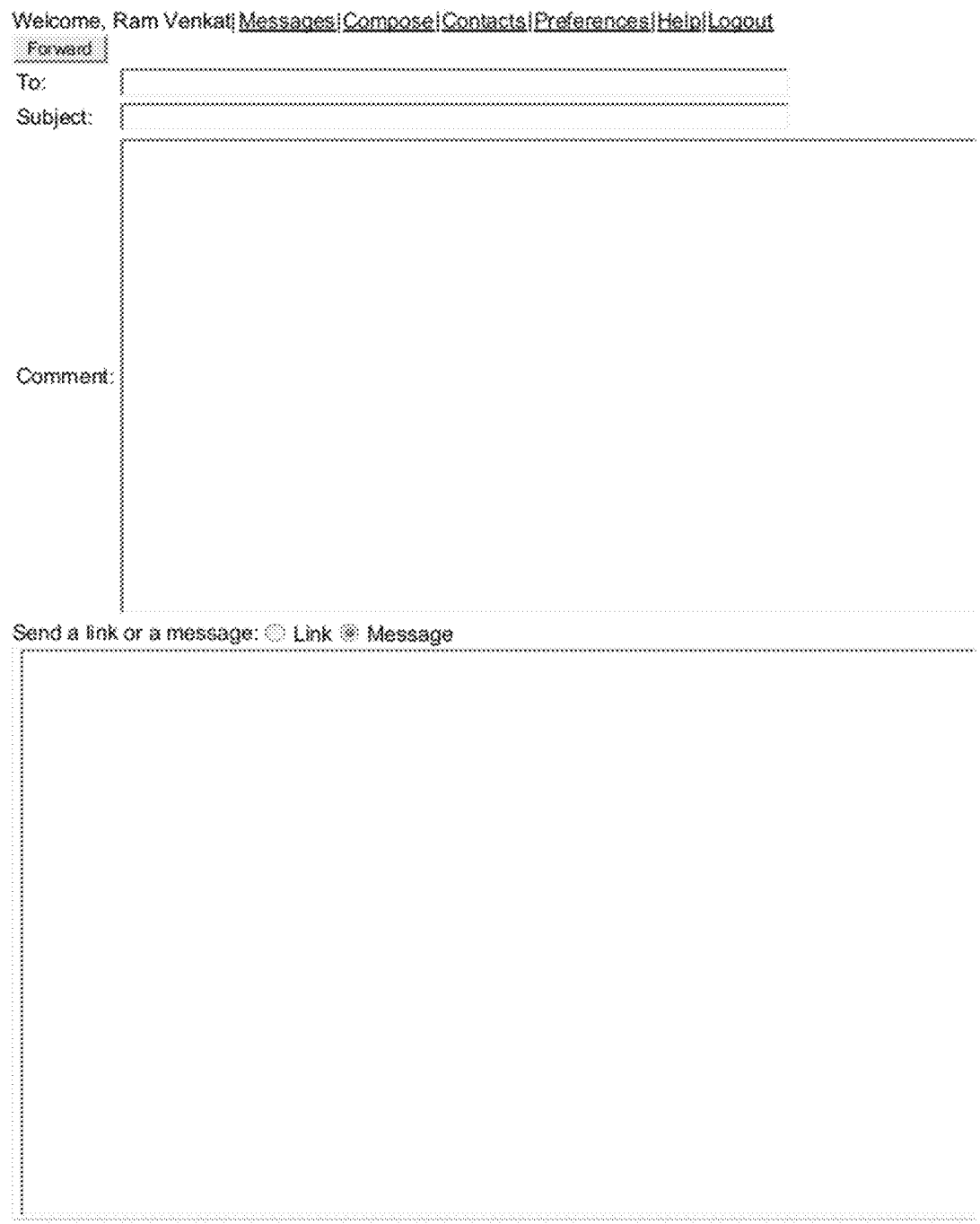
FIG. 5 shows a web page in which an user can compose a new message, add his comments and forward it to his friends.
Figure 6:
FIG. 6 shows a web page in which an user can forward a HTTP link to his friends.
Figure 9:
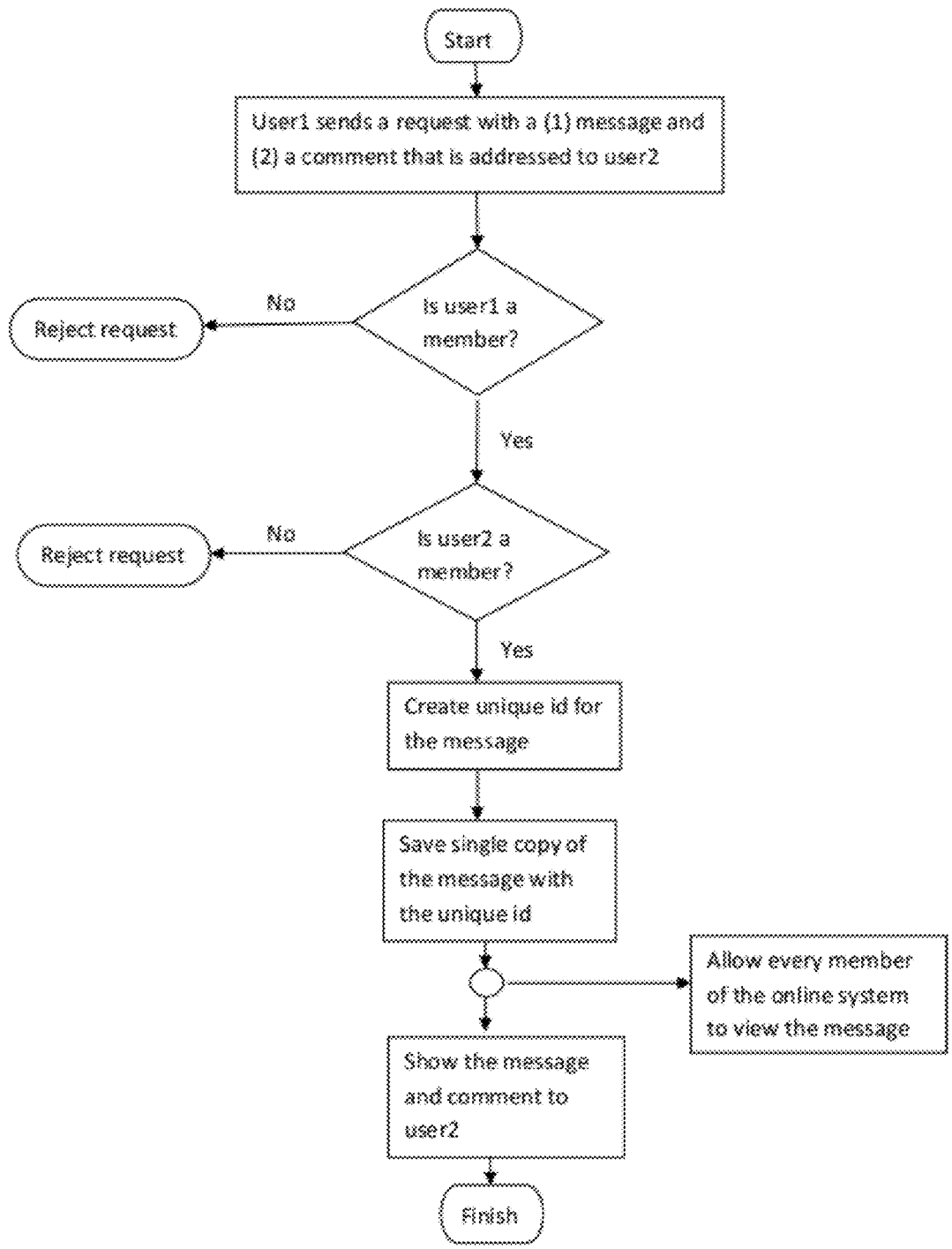
FIG. 9 shows the flow chart as the control flows when an user sends a new request.

FIG. 5 and FIG. 6 represent the page in which the user can compose a new message and forward it. FIG. 5 shows an user composing his own message while FIG. 6. shows an user forwarding a link to an external content. In both figures, the comments are specified separately from the message. In the 'To' field, the user can specify one or more member's username or email addresses separated by a comma.

FIG. 7 represents the page that allows the user to forward a message that he received from another member with his own comments. In the 'To' field, the user can specify one or more member's username or email addresses separated by a comma. The user can only forward his own comments with the message. The user cannot forward the comments of another member. This means that the system, in its normal use, will not allow the user to forward the comments of other people. Normal use of the system is defined as clicking on any button or link provided by the system. It is not considered normal use of the system if the user cuts and pastes or manually copies another member's comment into his own comment box.

Addressing Other Members:

The user can forward messages to other members using their unique username or their registered email address with the system. Each member can register any number of email addresses with the system. When a member registers an email address with the system, the system will send an email to that address with a unique URL. The member has to click on that URL to complete the registration of that email. This process is widely used in online systems to confirm that an user owns the email address that he is trying to register. Once a member registers an email address, other members can forward a message to that member using his registered email address. The system will map the email address to the member account and forward the message to the member that registered that email address.

If a member forwards a message to an email address that is not registered in the system, then the system can send an email to that address inviting that person to join the system.

Contacts List:

When the user receives a message from another member that member gets added to the user's contacts list. Also, when the user forwards a message to another member, that member gets added to the user's contacts list. The user can also manually add or remove other member's username in his contacts list.

Distribution Lists:

When the user forwards a message to a group of other members, the system automatically includes that group as a distribution list, if that group is not already present in the list. The user can give a unique name to each group in the distribution list. When the member subsequently includes one of the members in that list in the 'To:' box, the system can show an auto-completion list of all the distribution lists that have that member. This allows the user to quickly pick frequently used groups of friends that he forwards messages regularly.

Staying in Touch with Friends:

FIG. 8 shows the user's contacts list. It includes the last date and time a message was forwarded from the member and to the member. This page helps the user to stay in touch with friends by forwarding messages of mutual interest.

This page could be enhanced to include several other statistics related to each contact including:
 a) Total messages and comments forwarded and received to the friend
 b) Total days since forwarding/receiving the first message to/from the friend.
 c) Average number of messages and comments from/to the friend per day/week/month.

Dealing with SPAM:

Since this system allows the user to send a message to any other member using their ID or email address, it creates a situation in which a member receives unwanted messages.

The user can block another member from forwarding messages to him by explicitly blocking his username. If more than a few members block an user, then the system can mark that user as a spammer and prevent that user from forwarding any more messages.

As soon as the system decides that a message is SPAM, it can remove that message from all members' message list. This is not possible in a regular email, as messages are sent to another email server as soon as the sender sends them. This system maintains a single copy of the message in one central place. This allows the system to block a SPAM message early and prevent its propagation.

SPAM setting can be specific to each member. Each member can specify how many other members have to mark a message as SPAM before it disappears from his inbox. Further, the system can have an overall limit at which the message disappears from everyone's inbox. The system need not remove a SPAM message from a member's inbox if he has already read the message and forwarded it.

Also, spamming exists because it is easy to send an email to a large number of people from any computer on the internet. Since this is a central system that manages all message flow, it can restrict the number of forwards from the user. Typically, this restriction will not be imposed on forwarding messages to members who have already forwarded a message to the user.

Message Versioning and Additions:

Members that view the message can mark the message to say that they are interested in additional content. The author can see how many members expressed interest in additional content to his message. The author can add additional content to the message after he forwards it. If the author adds new content, each viewer that expressed interest in additional content will see the message as if it was forwarded to them again. The author can also version control the message and the system can show either all the versions of the message or just the latest version to other members.

Message Templates:

The system can provide message templates to create messages for a particular purpose. These messages will typically embed web forms in the message. When the message viewers submit an embedded web form, the system will execute an online transaction or send an online communication or save the web form values for further processing. Such message templates can be created to:

a) Buy a product or a service
b) Become a member of an organization
c) Participate in a survey
d) Grassroots Advocacy—Send a message to a legislator
e) Fundraising—Contribute money to a cause or an organization Advertisements:

Typically, the system would use an Ad Server to manage all the advertisements that are shown to the members. Additionally, the system can allow the author to control the advertisements shown to the message viewers. As an example, an author that represents a company that sells certain consumer products, can send a funny story to a list of members while showing an advertisement for the company's products on the side. When the story gets forwarded to other members, those other members also see the same advertisements.

Metrics:

The system can maintain and display several metrics related to the spread and popularity of messages. Some of the possible metrics are:
a) How many members read a message
b) How many members forwarded a message
c) How many times a message was forwarded.
d) How many members expressed interest in seeing updates to the message.

Non-Forwardable Note:

The user can create a new empty message but write some comments and forward them to another member. Since the other member cannot forward the comment, this usage allows the user to send a 'non-forwardable' note to another member. Such a feature does not exist in regular email.

What is claimed is:

1. A method of spreading a message in an online system of one or more server computers comprising:
   users registering with the online system and such users henceforth referred as members;
   allowing only said members to send and receive messages in the online system;
   receiving a message and an associated comment from a member of the online system;
   the member henceforth referred as the author;
   receiving a request from the author to show the message and the author's comment to one or more other members of the online system;
   assigning a unique identifier to the message;
   maintaining a single copy of the message in the online system;
   showing the message and the author's comment to members identified in the request; and allowing all members of said online system to view the message including members not identified in the request;
   recording and showing cumulative metrics on actions taken by each member related to said message including the number of times the message was shown; and
   restricting members not indentified in the request from viewing the author's comment.

2. The method as in 1 further comprising the author and other members that viewed the message to send one or more new comments on said message to other members.

3. The method as in 2 wherein a member is not allowed to forward another member's comment to other members.

4. The method as in claim 1 further comprising marking the message as spam.

5. The method as in claim 4 further comprising removing the message if more than a certain percentage of members mark the message as spam.

6. The method as in claim 1 further comprising adding and removing other members to or from a contact list of said member.

7. The method as in claim 6 further comprising maintaining the contact list of the member by adding members the member has communicated with.

8. The method as in claim 1 further comprising creating a distribution list when said message and said comment are shown to the other members.

9. The method as in claim 1 further comprising providing an auto-completion list for showing a message based on previously created distribution lists.

10. The method as in claim 1 further comprising indexing said message and said comment in a full text search index.

11. The method as in claim 1 further comprising adding search tags to said message and said comment.

12. The method as in claim 1 further comprising searching for messages and comments using keywords and tags.

13. The method as in claim 1 further comprising removing said message by the author.

14. The method as in claim 1 further comprising said author adding more content to said message after the message has been shown to one or more other members.

15. The method as in claim 1 further comprising showing an empty message with a non-empty comment to another member.

16. The method as in claim 1 further comprising managing advertisements that are shown along with said message.

17. The method as in claim 1 further comprising receiving a comment from a member endorsing or rejecting the said message.

18. An online system comprising one or more server computers, wherein each server computer said system:
   allows users to register with the online system and such users henceforth referred as members;
   allows only members to send and receive messages in the online system;
   receives a message and an associated comment from a member, the member henceforth referred as the author;
   receives a request from the author to show the message and the author's comment to one or more members;
   assigns a unique identifier to the message;
   maintains a single copy of the message in the online system;
   shows the message and the author's comment to other members identified in the request;
   allows all members of said online system including members not identified in the request to view the message;
   records and shows cumulative metrics on actions taken by each member related to said message-including the number of times the message was shown; and
   restricts members not identified in the request from viewing the author's comment.

19. The online system as in 18 further allowing the author and other members that viewed the message to send one or more new comments on said message to other members.

20. The online system as in 19 further restricting a member to not forward another member's comment to other members.

21. The online system as in claim 18 wherein said comment includes a subject line.

22. The online system as in claim 18 wherein said message includes a signature.

23. The online system as in claim 18 wherein said message is a hyperlink to a web page containing content.

24. The online system as in claim 18 wherein said message and said comment are formatted in a format selected from the group consisting of plain text, HTML, DHTML, XML, XHTML, and PDF.

25. The online system as in claim 18 wherein said message and said comment comprise one or more embedded hyperlinks, web forms, audio files and video files.

26. The online system as in claim 25 further recording and showing cumulative metrics on the usage of each link that is embedded in said message.

27. The online system as in claim 25 further recording and showing cumulative metrics on form values for each web form that is embedded in said message.

28. The online system as in claim 25 further recording and showing cumulative metrics on the amount of time members played each audio or video file embedded in said message.

29. The online system as in claim 25 further fulfilling an online transaction when said message includes a web form.

30. The online system as in claim 25 further sending an online communication when said message includes a web form.

31. The online system as in claim 25 further, comprising message templates wherein the template includes one or more web forms used to fulfill an online transaction and send an online communication.

32. The online system as in claim 18 wherein said message and said comment comprise one or more downloadable document attachments.

33. The online system as in claim 32 further recording and showing download metrics on each document that is attached to said message.

34. The online system as in claim 18 further comprising a version control tool for changing content of said message after the message has been shown and for allowing other members to see one or more concurrent versions of the message.

35. The online system as in claim 18 further comprising an Advertisement Server to show advertisements along with said message.

36. The online system as in claim 18 further recording a member endorsing or rejecting the message.

37. The online system as in claim 18 further recording and showing cumulative metrics on actions of members selected from at least the group consisting of viewing, endorsing, rejecting and displaying the message.

* * * * *